US011904507B2

(12) United States Patent
Albertelli et al.

(10) Patent No.: US 11,904,507 B2
(45) Date of Patent: Feb. 20, 2024

(54) METHOD OF SHAPING A CURED THERMOSETTING RESIN

(71) Applicant: Acell Industries Limited, Dublin (IE)

(72) Inventors: Aldino Albertelli, Dublin (IE); Roberto Zedda, Dublin (IE)

(73) Assignee: Acell Industries Limited, Dublin (IE)

( * ) Notice: Subject to any disclaimer, the term of this patent is extended or adjusted under 35 U.S.C. 154(b) by 202 days.

(21) Appl. No.: 16/497,346

(22) PCT Filed: Mar. 26, 2018

(86) PCT No.: PCT/GB2018/050790
§ 371 (c)(1),
(2) Date: Sep. 24, 2019

(87) PCT Pub. No.: WO2018/172799
PCT Pub. Date: Sep. 27, 2018

(65) Prior Publication Data
US 2021/0291414 A1    Sep. 23, 2021

(30) Foreign Application Priority Data

Mar. 24, 2017 (GB) ..................................... 1704750

(51) Int. Cl.
| B29C 35/08 | (2006.01) |
| B29C 35/04 | (2006.01) |
| B29C 67/24 | (2006.01) |
| B29C 35/02 | (2006.01) |
| B29K 67/00 | (2006.01) |
| B29K 75/00 | (2006.01) |
| B29K 101/10 | (2006.01) |
| B29K 309/08 | (2006.01) |

(52) U.S. Cl.
CPC ........ *B29C 35/0805* (2013.01); *B29C 35/041* (2013.01); *B29C 67/248* (2013.01); *B29C 2035/0283* (2013.01); *B29C 2035/042* (2013.01); *B29C 2035/0822* (2013.01); *B29C 2035/0855* (2013.01); *B29K 2067/00* (2013.01); *B29K 2075/00* (2013.01); *B29K 2101/10* (2013.01); *B29K 2309/08* (2013.01)

(58) Field of Classification Search
CPC . B29C 35/0805; B29C 35/041; B29C 67/248; B29C 2035/0283; B29C 2035/042; B29C 2035/0822; B29C 2035/0855; B29C 2067/00; B29C 2075/00; B29C 2101/10
See application file for complete search history.

(56) References Cited

U.S. PATENT DOCUMENTS

| 5,028,358 | A | 7/1991 | Blum |
| 5,844,217 | A | 12/1998 | Hawley et al. |
| 6,537,341 | B2 | 3/2003 | Dannenhauer et al. |
| 2005/0161865 | A1* | 7/2005 | Bristow ............... B29C 51/004 264/511 |
| 2008/0287557 | A1 | 11/2008 | Yoo et al. |
| 2011/0180207 | A1 | 7/2011 | Van Benthem et al. |
| 2012/0282421 | A1 | 11/2012 | Akita et al. |
| 2015/0224683 | A1* | 8/2015 | Hansen .................. B29C 35/08 264/403 |
| 2016/0279834 | A1 | 9/2016 | Anderson et al. |

FOREIGN PATENT DOCUMENTS

| CN | 102712131 | 10/2012 | |
| CN | 102905877 | 1/2013 | |
| CN | 104827687 | 8/2015 | |
| EP | 0985509 | 3/2000 | |
| JP | H 07-124950 | 5/1995 | |
| JP | 3156159 | 4/2001 | |
| JP | 2001342290 A | * 12/2001 | ............. B01J 31/02 |
| JP | 2002154162 | 5/2002 | |
| JP | 2002264221 | 9/2002 | |
| JP | 2004-033387 | 2/2004 | |
| JP | 2015-36394 | 2/2015 | |
| KR | 20030040642 | 5/2003 | |
| WO | WO-2009/044169 | 4/2009 | |
| WO | WO-2010/046698 | 4/2010 | |
| WO | WO-2010/046699 | 4/2010 | |

OTHER PUBLICATIONS

English Translation of JP 2001342290A (Year: 2001).*
Davidson, "Radiation Curing", 1996; 12(4): p. 20.

(Continued)

*Primary Examiner* — Joseph S Del Sole
*Assistant Examiner* — Jamel M Nelson
(74) *Attorney, Agent, or Firm* — Arnall Golden Gregory LLP

(57) ABSTRACT

The present invention relates to a method of shaping a cured thermosetting resin substrate, and more particularly to a method of shaping a cured thermosetting resin using electromagnetic radiation, said method comprises providing a cured thermosetting resin substrate; providing a confined temperature controlling environment; placing the cured thermosetting resin substrate in the confined temperature controlling environment; providing a source of electromagnetic radiation; irradiating the cured thermosetting resin substrate in the confined temperature controlling environment; and shaping the irradiated thermosetting resin substrate.

18 Claims, No Drawings

(56) References Cited

OTHER PUBLICATIONS

Fink, "Reactive Polymers Fundamentals and Applications: A Concise Guide to Industrial Polymers", second edition, 2013: p. 124.
García et al., "Recyclable, Strong Thermosets and Organogels via Paraformaldehyde Condensations with Diamines", Science, 2014; 344: pp. 732-735.
Hui (Ed.) "Handbook of Food Science, Technology, and Engineering", 2005; vol. 3: pp. 113-114.
Singh et al. (Ed.) "Green and Sustainable Manufacturing of Advanced Material", 2016, p. 584.
Search Report issued in related Application No. GB1704750.7, dated Jul. 31, 2017.
International Search Report and Written Opinion in related Application No. PCT/GB2018/050790, dated Jul. 3, 2018.
Notice of Preliminary Rejection issued by the Korean Intellectual Property Office in Application No. 10-2019-7030792, dated Dec. 23, 2022.

\* cited by examiner

METHOD OF SHAPING A CURED THERMOSETTING RESIN

TECHNICAL FIELD

The present invention relates to a method of shaping a cured thermosetting resin substrate, and more particularly to a method of shaping a cured thermosetting resin using electromagnetic radiation.

BACKGROUND OF THE INVENTION

Thermosetting polymers are commonly used in a variety of applications, including consumer goods, machine parts, medical equipment and packaging and storage materials. In particular, the use of thermosetting polymers is becoming increasingly common in the construction industry, for example for use in forming sandwich panels, floor and roof coverings, insulation, coatings, piping, and bridge structures.

During the formation of these products the thermosetting resin undergoes a cross-linking process (curing) to form products which typically have superior dimensional stability, high-temperature mechanical, thermal, and environmental resistance.

The cross-linking process is typically initiated by thermal processing, which involves the transfer of heat energy from a heat source to the thermosetting resin by convection, conduction and/or radiation. As the cross-linking reaction itself is exothermic, the release of this additional of heat energy within the thermosetting resin increases the rate at which the cross-linking reaction occurs and the extent of cross-linking within the resulting cured resin.

More recently, it has been found that such heating methods tend to provide non-uniform heating throughout the material, resulting in non-uniform cross-linking, and high running costs.

One option which has been considered is the use of microwaves, as a viable alternative method for curing thermosetting resins. Unlike traditional thermal processing techniques, which transfer heat energy, microwave energy is directed specifically to the material. As dipolar molecules naturally align with an external magnetic field, the application of an oscillating electromagnetic field, produced by microwave radiation, causes the dipolar molecules within the sample to constantly rotate in order to align with the alternating field. The constant rotation of these molecules generates heat through molecular friction.

The advantages of using microwave heating include shorter processing times, improved energy utilisation, and lower processing temperatures (see for example "Reactive Polymers Fundamentals and Applications: A Concise Guide to Industrial Polymers", by Johannes Karl Fink, second edition, 2013, page 124). Due to these advantages, the use of microwaves to cure (and therefore harden) thermosetting resins is becoming increasingly popular (see also for example "Radiation Curing", by R. S. Davidson, Volume 12, Number 4, page 20).

Regardless of the technique used for curing, it is generally understood that, once cured, the cross-linking process is irreversible, and thus cured thermosetting resins cannot be re-moulded or re-shaped (see for example "Green and Sustainable Manufacturing of Advanced Material", 2016 edited by M. Singh, T. Ohji, and R. Asthana, page 584).

Furthermore, it is also generally well known in the art that thermosetting polymers do not melt but thermally decompose upon heating, and so these materials cannot be re-processed using conventional methods associated with thermoplastic materials.

Thus, to date, recycling techniques relating to thermosetting polymers have been limited to mechanically grinding the cured polymer into fine particles for use as filler materials.

It is therefore well known that a particular issue relating to thermosetting resins is that these materials cannot be re-shaped use once fully cured. In addition, products produced from thermosetting resins which comprise defects cannot be sold and are simply classed as waste, as even minor defects cannot be repaired after curing. Such waste reduces the cost efficiency of working with these materials, and also limits their potential applications.

In view of the above, it would be of significant industrial and scientific interest to create a method of shaping cured thermosetting materials, such that they can, for example, be re-shaped, re-used, recycled and/or repaired (as opposed to simply being used as filler material for other products).

Furthermore, as cured thermosetting polymer materials are harder and more robust compared to their corresponding uncured state, they are easier to package, transport, store and handle. It would therefore be advantageous, commercially, to simply sell pre-cured thermosetting resin sheets and use a method of shaping these materials at a later date, as required.

Jeannette M. Garcia et al. (see "Recyclable, Strong Thermosets and Organogels via Paraformaldehyde Condensations with Diamines", Science, volume 344, pages 732 to 735) acknowledged that "all known thermosetting polymers are difficult to recycle because they cannot be remoulded once cured and thermally decompose upon heating to high temperatures". However, in order to try and address this issue, Garcia et al. developed methods of forming two new classes of nitrogen-containing thermoset polymers, which are depolymerisable under certain conditions. The first class, hemiaminal dynamic covalent networks (HDCNs) is formed by polymerising monomers containing two —$NH_2$ units, such as 4,4'-oxydianiline (ODA) or diamine-terminated polyethylene glycol) (PEG), with paraformaldehyde at temperatures of around 50° C. It is stated that the HDCNs exhibited highly versatile properties depending on the diamine monomer used during the polymerization, and that the properties ranged from high-strength, chemically robust materials to self-healing organogels that exhibit chemical reversibility in physiological pH regimes. The second class of materials is formed by chemically rearranging the HDCNs prepared from ODA by heating these materials to temperatures of around 200° C. The materials formed, poly(1,3,5-hexahydro-1,3,5-triazines) (PHTs), contained highly cross-linked polymer networks.

Garcia et al. states that both the HDCNs and ODA PHTs formed are completely depolymerised in the presence of a strong acidic solution (pH<2).

Although these thermoset polymers can be broken down into their original components, the depolymerisation method is highly specific to the polymers disclosed. There is no suggestion that the disclosed method could also be extended to other thermosetting resins, such as those commonly used in industry, nor that the cost of these new materials is commercially viable given their specialist nature. Furthermore, it is well-known in this field that most high-modulus materials are chemically inert, and so the use of a strong acid is unlikely to be affective in the depolymerisation of such materials.

Furthermore, the method disclosed by Garcia et al. requires the use of strong acids which can be expensive, not only to purchase but also due to the requirement of necessary reinforced equipment. In addition, strong acids are hazardous, particularly on large scales, such as the scale required for commercialisation of this method.

Thus, it would be advantageous to have a method of shaping cured thermoset materials that is applicable to known thermoset polymers. Further, a more cost efficient method of shaping cured thermoset resins involving reduced health risks, compared to previously known methods, would also be desirable.

With the present invention, and in direct contrast to the current understanding in the art, the inventors have surprisingly found that electromagnetic radiation can be used under certain conditions to shape pre-cured thermosetting resins. The present process allows known cured thermoset resins to be re-shaped using relatively simple, cost-effective methods.

SUMMARY OF INVENTION

In accordance with an aspect of the present invention, there is provided a method of shaping a cured thermosetting resin substrate, the method comprising the steps of:
 i. providing a cured thermosetting resin substrate;
 ii. providing a confined temperature controlling environment;
 iii. placing the cured thermosetting resin substrate in the confined temperature controlling environment;
 iv. providing a source of electromagnetic radiation;
 v. irradiating the cured thermosetting resin substrate in the confined temperature controlling environment; and
 vi. shaping the irradiated thermosetting resin substrate.

Without wishing to be bound by any theory, it is believed that the electromagnetic radiation is able to provide energy to the cured thermosetting resin substrate in such a way as to significantly increase the internal vibrations of the resin on potentially both a molecular and atomic level. A by-product of this process is the formation of heat within the cured thermosetting resin, which under standard conditions would lead to thermal degradation of the cured resin substrate or the initiation of further cross-linking/pushing the reaction equilibrium towards cross-linking within the cured thermosetting resin substrate. It is believed that the presence of the temperature controlling environment mitigates the effects with respect to thermal degradation and/or cross-linking, thus potentially allowing the molecular and atomic vibrations of the cured thermosetting resin to be dominate. It is this which is believed to allow the cured thermosetting resin to be shaped.

In accordance with the present invention, the confined temperature controlling environment is considered to comprise any confined environment comprising a substance which is able to absorb thermal energy from the cured thermosetting resin substrate. In use, the intended purpose of the confined temperature controlling environment is to try and prevent the cured thermosetting resin substrate from being heated to a temperature at which thermal degradation and/or further cross-linking would be the dominant characteristic.

By way of example, with many thermosetting resin substrates, it is necessary to try and prevent the bulk resin substrate from being heated to a temperature above 150° C., such as above 120° C. In some embodiments, it is preferable to prevent the substrate from reaching a temperature of above 110° C., such as above 100° C.

In particular, the confined temperature controlling environment may preferably be a substance having a higher mass heat capacity compared to that of the cured thermosetting resin substrate. Having regard to the above, and again without wishing to be bound by any particular theory, it is believed that the temperature controlling environment acts as a heat sink, and is able to absorb heat energy from the cured thermosetting substrate as it is irradiated. The result of this is that in some embodiments, a temperature differential between the cured thermosetting resin and the temperature controlling environment can be seen.

Preferably, the substance of the confined temperature controlling environment does not react chemically with the cured thermosetting resin substrate.

The substance of the confined temperature controlling environment may be in the form of a gas, vapour, liquid or gel, or a combination thereof. In a preferred embodiment, the confined temperature controlling environment substance is a liquid.

Where the temperature controlling environment substance is a liquid, it is preferable for it to have a boiling point of 80° C. or more, such as 100° C. or more. Depending on the liquid substance used, it can be envisaged that such a substance could have a boiling point of greater than 120° C. or more, and even as high as 150° C. or more. It will be appreciated that based on the theory above, there is a balance to be struck between the amount of energy supplied to the cured resin substrate, the temperature at which the cured resin substrate will start to thermally degrade, and the amount of heat energy which the temperature controlling environment needs to absorb.

Preferred liquids for use as a confined temperature controlling environment include ethylene glycol, butanol, toluene, decane and water, as well as combinations thereof. More preferably, the confined temperature controlling environment is water.

The use of water as a confined temperature controlling environment is considered to be particularly advantageous, as water is not only inexpensive but has minimum safety risks.

In a preferred embodiment, the cured thermosetting resin substrate may be at least substantially immersed in the confined temperature controlling environment. By substantially immersed it is meant that greater than 50% of the resin cured substrate is within the temperature controlling environment. In principle, during use, the substrate may be immersed in an amount greater than 60%, such as greater than 70%, including 80%, 90% and as much as 95%.

In a preferred embodiment, the cured thermosetting resin substrate may be completely immersed in the confined temperature controlling environment.

With respect to the cured resin substrate itself, the term immersed is considered to encompass, but is not limited to, a surface coating on the cured resin substrate of the confined temperature controlling environment in the form a liquid or gel; and an area directly adjacent to the cured thermosetting resin substrate which comprises the confined temperature controlled environment in the form of a vapour or gas.

Where the temperature controlling environment is in the form of a liquid or gel, it may be applied to the cured thermosetting resin substrate by means of spray coating, dipping, brushing, electrostatic techniques or other such processes. The use of such processes are within the knowledge of the person of skill in the art and can be applied as necessary once the temperature controlling environment substance is known.

Alternatively, the cured thermosetting resin substrate may simply be placed within a vessel containing the selected temperature controlling environment liquid or gel substance.

Where the confined temperature controlling environment is selected from a vapour or gas, the cured thermosetting resin substrate may be placed within a vessel comprising the confined temperature controlling environment gas or vapour. Once again, the vapour or gas may be supplied to the substrate using means known to a person of skill in the art.

In other embodiments, the confined temperature controlling environment gas or vapour may be provided in the form of a continuous stream, which is directed at the surface, across the surface, and/or adjacent to the surface of the cured thermosetting resin substrate to be shaped.

The process of the present invention is considered to be applicable to thermosetting resins in general, and at least to all thermosetting materials commercially in use.

It will be appreciated that, and indeed would be well within the knowledge of the person of skill in the art, that whilst the cured thermosetting resin substrate may be frangible, it must be of sufficient strength to substantially withstand the pressure applied during the shaping step.

The cured thermosetting resin substrates used in the present invention may have a density in the range of 75 to 500 kg/m$^3$, such as 120 to 400 kg/m$^3$ and in some embodiments 120 to 250 kg/m$^3$. The density of the foam material can readily be determined by simple experiment, such as ASTM D792-13, ASTM D1505-10 and ASTM D1622.

In an embodiment, the cured thermosetting resin substrate is a foamed material. The cured thermosetting resin substrate may be a self-supporting material, and in many applications is a rigid self-supporting foam material.

Such materials are known to have cellular structures. The cellular structures may be open-celled, closed-celled or a mixture thereof. In a preferred embodiment, the cured thermosetting resin substrate has a substantially open-celled structure.

Where the cured thermosetting resin substrate is an open-celled foam, it is believed that the presence of an open-celled structure may be advantageous for a number of reasons. Firstly, the presence of cells within the foam means that the cured thermosetting resin substrate is itself is less dense than a non-foamed substrate. A reduction in density has shown in improvement in the penetration of the electromagnetic radiation into the substrate.

Secondly, the presence of the open-cell structures means that the pores of the substrate are interconnected. These interconnected pores enable the confined temperature controlled environment, whether in the form of a gas, vapour, liquid, or gel to be present throughout the structure of the cured thermosetting resin substrate. This in turn, based on the theory above, enables a more effective control of the temperature absorption throughout the thickness of the cured thermosetting resin substrate during irradiation.

Where an open-celled cured thermosetting resin substrate is used, the substrate may comprise micropores, mesopores, macropores or a combination thereof. For the purposes of the present application, the terms have the following meaning: micropore is considered to be a pore of diameter 2 nm or less, mesopore is considered to be a pore of diameter 2 nm to 50 nm; and macropore is considered to be a pore of diameter of 50 nm or above. Such pore sizes may be measured using conventional techniques such as the Gurley Hill porosity tests known by TAPPI T460 and ISO 5636-5, as well as the Bendtsen air permeability test known by ISO 5636-3. Other processes include ISO 4590:2002 which determines the volume percentage of open cells and closed cells in rigid plastics materials.

Whatever the pore size, it will be appreciated that it is desirable for the pore size of the cured thermosetting resin substrate to be of sufficient size to enable the confined temperature controlling environment substance to penetrate the open-cell resin structure.

Where the cured thermosetting resin substrate comprises an open-cell structure, it is preferred that at least 50% of the available pore volume is filled with the substance of the confined temperature controlling environment. More preferably, at least 60% of the available pore volume and even more preferably at least 70% of the pore volume is filled. Still more preferably, at least 80% of the available pore volume of the open-celled cured thermosetting resin substrate is filled with the confined temperature controlling environment. In some embodiments, it may be possible to reach levels of at least 90% or more of the available pore volume of the cured thermosetting resin substrate being filled with the confined temperature controlling environment substance.

It is envisaged that, in embodiments where necessary, the temperature controlled environment may be provided to the cured thermosetting resin substrate under pressure. The use of pressure may have a number of benefits when used in the present invention including ensuring that the temperature controlled environment substance is forced into the cells of the open-celled resin substrate and thus improve the pore volume fill. By way of example, the temperature controlling environment substance can be provided at pressures known to those of skill in the art, and could be for example 120 kPa.

The cured thermosetting resin substrate may comprise other formations to increase the surface area of the substrate, such as grooves or channels. Where present, the channels may extend at least part way through the resin substrate, and in some embodiments, may extend substantially through the thickness of the resin structure. The presence of such groves or channels also increases the surface area of the cured thermosetting resin substrate which comes into contact with the confined temperature controlling environment. It will also be appreciated that, in accordance with the present invention, the cured thermosetting resin substrate may comprise both an open-celled structure as well as additional features to increase the surface area of the resin substrate, such as by using grooves or channels, which comes into contact with the temperature controlling environment substance.

The cured thermosetting resin substrate may also comprise perforations in the surface of the resin substrate. In one embodiment, the perforations may be present on at least part of the surface of the cured thermosetting resin substrate. Alternatively, the perforations may be present across the whole of the surface of the thermosetting resin substrate. It will be appreciated that the presence of perforations increases the surface area of the resin substrate that is available for contact with the confined temperature controlling environment.

The cured thermosetting resin substrate may be formed from one or more materials selected from a phenolic resin, polyester, acrylic resin, vinyl ester, polyurethane, and/or an epoxy resin.

In a preferred embodiment, the thermosetting resin is a phenolic resin.

In a preferred example of a phenolic resin, the substrate produced is an open-celled phenolic resin foam. Such a material may be produced by effecting a curing reaction between:

(a) a liquid phenolic resole having a reactivity number (as defined below) of at least 1; and (b) a strong acid hardener for the resole, in the presence of:

(c) a finely divided inert and insoluble particulate solid which is present in an amount of at least 5% by weight of the liquid resole and is substantially uniformly dispersed through the mixture containing resole and hardener; the temperature of the mixture containing resole and hardener due to applied heat not exceeding 85° C. and the said temperature and the concentration of the acid hardener being such that compounds generated as by-products of the curing reaction are volatilised within the mixture before the mixture sets whereby a foamed phenolic resin product is produced.

By a phenolic resole is meant a solution in a suitable solvent of the acid-curable prepolymer composition obtained by condensing, usually in the presence of an alkaline catalyst such as sodium hydroxide, at least one phenolic compound with at least one aldehyde, in well-known manner. Examples of phenols that may be employed are phenol itself and substituted, usually alkyl substituted, derivatives thereof provided that the three positions on the phenolic benzene ring ortho- and para- to the phenolic hydroxyl group are unsubstituted. Mixtures of such phenols may also be used. Mixtures of one or more than one of such phenols with substituted phenols in which one of the ortho- or para-positions has been substituted may also be employed where an improvement in the flow characteristics of the resole is required but the cured products will be less highly cross-linked. However, in general, the phenol will be comprised mainly or entirely of phenol itself, for economic reasons.

The aldehyde will generally be formaldehyde although the use of higher molecular weight aldehydes is not excluded.

The phenol/aldehyde condensation product component of the resole is suitably formed by reaction of the phenol with at least 1 mole of formaldehyde per mole of the phenol, the formaldehyde being generally provided as a solution in water, for example as formalin. It is preferred to use a molar ratio of formaldehyde to phenol of at least 1.25 to 1 but ratios above 2.5 to 1 are preferably avoided. The most preferred range is 1.4 to 2.0 to 1.

The mixture may also contain a compound having two active H atoms (dihydric compound) that will react with the phenol/aldehyde reaction product of the resole during the curing step to reduce the density of cross-linking. Preferred dihydric compounds are diols, especially alkylene diols or diols in which the chain of atoms between the OH groups contains not only methylene and/or alkyl-substituted methylene groups but also one or more hetero atoms, especially oxygen atoms, for example ethylene glycol, propylene glycol, propane-1,3-diol, butane-1,4-diol and neopentyl glycol. Particularly preferred diols are poly-, especially di-, (alkylene ether) diols for example diethylene glycol and, especially, dipropylene glycol. Preferably the dihydric compound is present in an amount of from 0 to 35% by weight, more preferably 0 to 25% by weight, based on the weight of phenol/aldehyde condensation product. Most preferably, the dihydric compound, when used, is present in an amount of from 5 to 15% by weight based on the weight of phenol/aldehyde condensation product. When such resoles containing dihydric compounds are employed in the present process, products having a particularly good combination of physical properties, especially strength, can be obtained.

Suitably, the dihydric compound is added to the formed resole and preferably has 2 to 6 atoms between —OH groups.

The resole may comprise a solution of the phenol/aldehyde reaction product in water or in any other suitable solvent or in a solvent mixture, which may or may not include water. Where water is used as the sole solvent, it is preferred to be present in an amount of from 15 to 35% by weight of the resole, preferably 20 to 30%. Of course the water content may be substantially less if it is used in conjunction with a co-solvent, for example an alcohol or one of the above-mentioned dihydric compounds where one is used.

As indicated above, the liquid resole (i.e. the solution of phenol/aldehyde product optionally containing dihydric compound) must have a reactivity number of at least 1. The reactivity number is 10/x where x is the time in minutes required to harden the resole using 10% by weight of the resole of a 66 to 67% aqueous solution of p-toluene sulfonic acid at 60° C. The test involves mixing about 5 ml of the resole with the stated amount of the p-toluene sulfonic acid solution in a test tube, immersing the test tube in a water bath heated to 60° C. and measuring the time required for the mixture to become hard to the touch. The resole should have a reactivity number of at least 1 for useful foamed products to be produced and preferably the resole has a reactivity number of at least 5, most preferably at least 10.

The pH of the resole, which is generally alkaline, is preferably adjusted to about 7, if necessary, for use in the process, suitably by the addition of a weak organic acid such as lactic acid.

Examples of strong acid hardeners are inorganic acids such as hydrochloric acid, sulphuric acid and phosphoric acid, and strong organic acids such as aromatic sulphonic acids, for example toluene sulphonic acids, and trichloroacetic acid. Weak acids such as acetic acid and propionic acid are generally not suitable. The preferred hardeners for the process of the invention are the aromatic sulfonic acids, especially toluene sulfonic acids.

The acid may be used as a solution in a suitable solvent such as water.

When the mixture of resole, hardener and solid is to be poured, for example into a mould and in slush moulding applications, the amount of inert solid that can be added to the resole and hardener is determined by the viscosity of the mixture of resole and hardener in the absence of the solid. For these applications, it is preferred that the hardener is provided in a form, for example solution, such that when mixed with the resole in the required amount yields a liquid having an apparent viscosity not exceeding about 50 poises at the temperature at which the mixture is to be used, and the preferred range is 5 to 20 poises. Below 5 Poises, the amount of solvent present tends to present difficulties during the curing reaction.

The curing reaction is exothermic and will therefore of itself cause the temperature of the mixture containing resole and acid hardener to be raised. The temperature of the mixture may also be raised by applied heat but the temperature to which said mixture may then be raised (that is, excluding the effect of any exotherm) must not exceed 85° C.

If the temperature of the mixture exceeds 85° C. before addition of the hardener, it is difficult or impossible thereafter to properly disperse the hardener through the mixture because of incipient curing. On the other hand, it is difficult, if not impossible, to uniformly heat the mixture above 85° C. after addition of the hardener.

Increasing the temperature towards 85° C. tends to lead to coarseness and non-uniformity of the texture of the foam but this can be offset at least to some extent at moderate temperatures by reducing the concentration of hardener. However at temperatures much above 75° C. even the minimum amount of hardener required to cause the composition to set is generally too much to avoid these disadvantages. Thus, temperatures above 75° C. are preferably avoided and preferred temperatures for most applications are from ambient temperature to about 75° C. The preferred temperature range appears to depend to some extent on the nature of the solid (c). For most solids it is from 25 to 65° C. but for some solids, in particular wood flour and grain flour, the preferred range is 25 to 75° C. The most preferred temperature range is 30 to 50° C. Temperatures below ambient, e.g. down to 10° C. can be used, if desired, but no advantage is gained thereby. In general, at temperatures up to 75° C., increase in temperature leads to decrease in the density of the foam and vice versa.

The amount of hardener present also affects the nature of the product as well as the rate of hardening. Thus, increasing the amount of hardener not only has the effect of reducing the time required to harden the composition but above a certain level dependant on the temperature and nature of the resole it also tends to produce a less uniform cell structure. It also tends to increase the density of the foam because of the increase in the rate of hardening. In fact, if too high a concentration of hardener is used, the rate of hardening may be so rapid that no foaming occurs at all and under some conditions the reaction can become explosive because of the build-up of gas inside a hardened shell of resin. The appropriate amount of hardener will depend primarily on the temperature of the mixture of resole and hardener prior to the commencement of the exothermic curing reaction and the reactivity number of the resole and will vary inversely with the chosen temperature and the reactivity number. The preferred range of hardener concentration is the equivalent of 2 to 20 parts by weight of p-toluene sulfonic acid per 100 parts by weight of phenol/aldehyde reaction product in the resole assuming that the resole has a substantially neutral reaction, i.e. a pH of about 7. By equivalent to p-toluene sulfonic acid, we mean the amount of chosen hardener required to give substantially the same setting time as the stated amount of p-toluene sulfonic acid. The most suitable amount for any given temperature and combination of resole and finely divided solid is readily determinable by simple experiment. Where the preferred temperature range is 25 to 75° C. and the resole has a reactivity number of at least 10, the best results are generally obtained with the use of hardener in amounts equivalent to 3 to 10 parts of p-toluene sulfonic acid per 100 parts by weight of the phenol/aldehyde reaction product. For use with temperatures below 25° C. or resoles having a reactivity number below 10, it may be necessary to use more hardener.

It may be necessary to make some adjustment of the hardener composition in accordance with the nature, especially shape and size, of the mould and this can be established by experiment.

By suitable control of the temperature and of the hardener concentration, the time lapse between adding the hardener to the resole and the composition becoming hard (referred to herein as the setting time) can be varied at will from a few seconds to up to an hour or even more, without substantially affecting the density and cell structure of the product.

Another factor that controls the amount of hardener required can be the nature of the inert solid. Very few are exactly neutral and if the solid has an alkaline reaction, even if only very slight, more hardener may be required because of the tendency of the filler to neutralize it. It is therefore to be understood that the preferred values for hardener concentration given above do not take into account any such effect of the solid. Any adjustment required because of the nature of the solid will depend on the amount of solid used and can be determined by simple experiment.

The exothermic curing reaction of the resole and acid hardener leads to the formation of by-products, particularly aldehyde and water, which are at least partially volatilised.

The curing reaction is effected in the presence of a finely divided inert and insoluble particulate solid which is substantially uniformly dispersed throughout the mixture of resole and hardener. By an inert solid we mean that in the quantity it is used it does not prevent the curing reaction.

It is believed that the finely divided particulate solid provides nuclei for the gas bubbles formed by the volatilisation of the small molecules, primarily $CH_2O$ and/or $H_2O$, present in the resole and/or generated by the curing action, and provides sites at which bubble formation is promoted, thereby assisting uniformity of pore size. The presence of the finely divided solid may also promote stabilization of the individual bubbles and reduce the tendency of bubbles to agglomerate and eventually cause likelihood of bubble collapse prior to cure. The phenomenon may be similar to that of froth flotation employed in the concentration of low grade ores in metallurgy. In any event, the presence of the solid is essential to the formation of the product. To achieve the desired effect, the solid should be present in an amount of not less than 5% by weight based on the weight of the resole.

Any finely divided particulate solid that is insoluble in the reaction mixture is suitable, provided it is inert. The fillers may be organic or inorganic (including metallic), and crystalline or amorphous. Even fibrous solids have been found to be effective, although not preferred. Examples include clays, clay minerals, talc, vermiculite, metal oxides, calcium carbonate, calcium sulphate, alumina, graphite, refractories, solid or hollow glass microspheres, fly ash, coal dust, wood flour, grain flour, nut shell flour, silica, mineral fibres such as finely chopped glass fibre and finely divided asbestos, chopped fibres, finely chopped natural or synthetic fibres, ground plastics and resins whether in the form of powder or fibres, for example reclaimed waste plastics and resins, pigments such as powdered paint and carbon black, and starches.

Solids having more than a slightly alkaline reaction, for example silicates and carbonates of alkali metals, are preferably avoided because of their tendency to react with the acid hardener. Solids such as talc, however, which have a very mild alkaline reaction, in some cases because of contamination with more strongly alkaline materials such as magnesite, are acceptable.

Some materials, especially fibrous materials such as wood flour, can be absorbent and it may therefore be necessary to use generally larger amounts of these materials than non-fibrous materials, to achieve valuable foamed products.

Such filler materials are also suitable for use in other thermosetting materials in accordance with the present invention, and it will be appreciated that their use is not limited solely to phenolic foam resins.

The solids preferably have a particle size in the range 0.5 to 800 microns. If the particle size is too great, the cell structure of the foam tends to become undesirably coarse. On the other hand, at very small particle sizes, the foams obtained tend to be rather dense. The preferred range is 1 to 100 microns, most preferably 2 to 40 microns. Uniformity of cell structure appears to be encouraged by uniformity of particle size. Mixtures of solids may be used if desired.

If desired, solids such as finely divided metal powders may be included which contribute to the volume of gas or vapour generated during the process. If used alone, however, it be understood that the residues they leave after the gas by decomposition or chemical reaction satisfy the requirements of the inert and insoluble finely divided particulate solid required by the process of the invention.

Preferably, the finely divided solid has a density that is not greatly different from that of the resole, so as to reduce the possibility of the finely divided solid tending to accumulate towards the bottom of the mixture after mixing.

One preferred class of solids is the hydraulic cements, for example gypsum and plaster, but not Portland cement because of its alkalinity. These solids will tend to react with water present in the reaction mixture to produce a hardened skeletal structure within the cured resin product. Moreover, the reaction with the water is also exothermic and assists in the foaming and curing reaction. Foamed products obtained using these materials have particularly valuable physical properties. Moreover, when exposed to flame even for long periods of time they tend to char to a brick-like consistency that is still strong and capable of supporting loads. The products also have excellent thermal insulation and energy absorption properties. The preferred amount of inert particulate solid is from 20 to 200 parts by weight per 100 parts by weight of resole.

Another class of solids that is preferred because its use yields products having properties similar to those obtained using hydraulic cements comprises talc and fly ash (which materials may also be used with other thermosetting resins of the present invention). The preferred amounts of these solids are also 20 to 200 parts by weight per 100 parts by weight of resole.

For the above classes of solid, the most preferred range is 50 to 150 parts per 100 parts of resole.

Thixotropic foam-forming mixtures can be obtained if a very finely divided solid such as Aerosil (finely divided silica) is included.

In some embodiments, a finely divided metal powder may be included. Such metal powders can act as a microwave susceptor helping to increase the electromagnetic radiation absorbed by the cured thermosetting resin. As with other embodiments, such metal powders may be used with other thermosetting resins in accordance with the repent invention. Where present, the metal powder is preferably used in amounts of from 50 to 250 parts per 100 parts by weight of resole.

In general, the maximum amount of solid that can be employed is controlled only by the physical problem of incorporating it into the mixture and handling the mixture. In general it is desired that the mixture is pourable but even at quite high solids concentrations, when the mixture is like a dough or paste and cannot be poured, foamed products with valuable properties can be obtained.

In general, it is preferred to use the fibrous solids only in conjunction with a non-fibrous solid since otherwise the foam texture tends to be poorer.

Other additives may be included in the foam-forming mixture; e.g. surfactants, such as anionic materials e.g. sodium salts of long chain alkyl benzene sulfonic acids, non-ionic materials such as those based on poly(ethylene oxide) or copolymers thereof, and cationic materials such as long chain quaternary ammonium compounds or those based on polyacrylamides; viscosity modifiers such as alkyl cellulose especially methyl cellulose, and colorants such as dyes or pigments. Plasticisers for phenolic resins may also be included provided the curing and foaming reactions are not suppressed thereby, and polyfunctional compounds other than the dihydric compounds referred to above may be included which take part in the cross-linking reaction which occurs in curing; e.g. di- or poly-amines, di- or poly-isocyanates, di- or poly-carboxylic acids and aminoalcohols.

Polymerisable unsaturated compounds may also be included possibly together with free-radical polymerisation initiators that are activated during the curing action for example acrylic monomers, so-called urethane acrylates, styrene, maleic acid and derivatives thereof, and mixtures thereof.

Other resins may be included for example as prepolymers which are cured during the foaming and curing reaction or as powders, emulsions or dispersions. Examples are polyacetals such as polyvinyl acetals, vinyl polymers, olefin polymers, polyesters, acrylic polymers and styrene polymers, polyurethanes and prepolymers thereof and polyester prepolymers, as well as melamine resins, phenolic novolaks, etc.

Conventional blowing agents may also be included to enhance the foaming reaction, for example low boiling organic compounds or compounds which decompose or react to produce gases.

The foam-forming compositions may also contain dehydrators, if desired.

A preferred method of forming the foam-forming composition comprises first mixing the resole and inert filler to obtain a substantially uniform dispersion of the filler in the resole, and thereafter adding the hardener. Uniform distribution of both the filler and the hardener throughout the composition is essential for the production of uniformly textured foam products and therefore thorough mixing is required.

If it is desired that the composition is at elevated temperature prior to commencement of the exothermic reaction, this can be achieved by heating the resole or first mixing the resole and the solid and then heating the mixture. Preferably the solid is added to the resole just before the addition of the hardener. Alternatively, the mixture of resole, solid and hardener may be prepared and the whole mixture then heated, for example by short wave irradiation, preferably after it has been charged to a mould. A conventional radiant heat oven may also be used, if desired, but it is difficult to achieve uniform heating of the mixture by this means.

Preferably, the foam may have a density in the range 75 to 500 kg/m$^3$, more preferably 100 to 400 kg/m$^3$ and most preferably 100 to 250 kg/m$^3$. Foam cell size is also important because up to a limit the larger the size of the cell for a given density, the thicker will be the walls and hence the greater the physical strength of the foam. However if the cell size is too large, the strength begins to suffer. Preferably, the cell size may be in the range of 1 to 3 mm.

In another preferred embodiment, the thermosetting resin used in the present invention is polyurethane.

In some embodiments of the present invention, a suitable polyurethane polymer matrix is formed by reacting at least one isocyanate and at least one polyol, wherein the reaction is performed at a temperature between 20 and 150° C., preferably between 100 and 150° C. In a preferred embodiment, the reaction mixture further comprises a basic catalyst; such as sodium hydroxide, sodium acetate or an amine catalyst, preferably the catalyst is selected from a tertiary amine.

The at least one polyol used to produce a polyurethane matrix may be selected from a polyether, polyester or a compound comprising a hydrocarbon back-bone, such as castor oil. In particular, the polyol of the present invention is selected from poly(oxypropylene glycol), poly(oxytetramethylene glycol), poly(ethylene adipate) and aliphatic hydrocarbons.

The at least one isocyanate used to produce a polyurethane matrix may be selected from diisocyanate, oligomeric isocyanate or polyisocyanate. A particularly preferred diisocyanate being methylene bis diphenylisocyanate (MDI). Paricularly preferred polyisocyanates are hexamethylene diiscocyanate and hydrogenated MDI (HMDI).

In a preferred embodiment of the present invention, one or more of the selected isocyanoate(s) may further comprise an amine functional group, wherein the amine functional group is selected from an alkanoamine, an alkoxylated amine, a Mannich polymer or a combination thereof.

In a further preferred embodiment of the present invention, the polymer matrix comprises a sheet-form material.

In a preferred alternative of the present invention, the thermosetting resin substrate may be selected from a sheet moulding compound (SMC).

Sheet moulding compounds (SMC) comprise a thermosetting resin, for example a polyester resin, vinyl ester or epoxy resin together with reinforcing fibres, for example glass fibres. In yet a further embodiment of a sheet moulding compound, and one which is preferred, the thermosetting resin may be a phenolic resin.

The reinforcing fibres may be short or long fibres. The fibres may be loose, for example, the fibres may be arranged in a uni- or multi-directional manner. The fibres may be part of a network, for example woven or knitted together in any appropriate manner. The arrangement of the fibres may be random or regular, and may comprise a fabric, mat, felt or woven or other arrangement. The material may include short fibres. Fibres may provide a continuous filament winding. Further, more than one layer of fibres may be provided.

The fibres may include one or more materials. For example the fibres may include one or more of carbon fibres, glass fibres, aramid fibres and/or polyethylene fibres. Kevlar® fibres may also be used. Preferably, the reinforcing fibres are glass fibres.

In a preferred embodiment, the cured thermosetting resin may further comprise additives, for example minerals, inert fillers, pigments, stabilizers, inhibitors, release agents, catalysts, thickeners, hydrating additives and/or other suitable materials. Examples of suitable additives include those described above with respect to the foamed phenolic resin material.

However, for the avoidance of any doubt, the inert fillers may be organic or inorganic (including metallic), and crystalline or amorphous. Even fibrous solids have been found to be effective, although not preferred. Examples of suitable filler materials include clays, clay minerals, talc, calcium carbonate, calcium sulphate, alumina, graphite, vermiculite, metal oxides, refractories, solid or hollow glass microspheres, fly ash, coal dust, wood flour, grain flour, nut shell flour, silica, mineral fibres such as finely chopped glass fibre and finely divided asbestos, chopped fibres, finely chopped natural or synthetic fibres, ground plastics and resins whether in the form of powder or fibres, for example reclaimed waste plastics and resins, pigments such as powdered paint and carbon black, and starches.

In accordance with the present invention, the term "electromagnetic radiation" is considered to relate to a form of energy released and absorbed by charged particles, and the wavelength of the electromagnetic radiation falls within a range of $1 \times 10^{-11}$ m and $1 \times 10^5$ m. In particular, the term "electromagnetic radiation" is considered to encompass one or more of gamma rays, X-rays, UV rays, visible light, infra-red rays, microwaves, radio waves and long radio waves, as well as combinations thereof.

Preferably, the electromagnetic radiation is selected from microwave radiation, radio waves (RF), ultra-sound and infrared, as well as combinations thereof.

In a preferred embodiment, the cured thermosetting resin substrate is irradiated using microwaves.

In one embodiment of the present invention, substantially all of the cured thermosetting resin substrate is irradiated, for example, using microwave radiation and is shaped, as required.

In an alternative embodiment, irradiation may be limited to only a part of the cured thermosetting resin substrate, for example through the use of focussed electromagnetic (for example microwave radiation). It will be appreciated that this process may be repeated multiple times with respect to the same area, for example where one particular area of the substrate requires numerous specific shaping processes. Alternatively, this process may be repeated with respect to different areas of the substrate, where it is preferable to shape these separate areas in isolation. The electromagnetic radiation used in the present invention may have a wavelength of between 1 mm and 1 m, and preferably has a wavelength of between 10 cm and 50 cm.

Where microwave electromagnetic radiation is used in accordance with the present invention, the microwaves preferably have a frequency of 300 GHz to 300 MHz. More preferably, the microwaves have a frequency of 25 GHz to 450 MHz.

The source of microwave electromagnetic radiation may transmit a power of 500 W to 120 kW, more preferably source of microwave radiation transmits a power of 750 W to 100 kW, such as 950 W to 75 kW.

Where microwave electromagnetic radiation is used, this radiation may be generated using either a domestic or a commercial microwave oven. For the purposes of the present application, the term "domestic microwave oven" is considered to encompass microwave ovens providing a power output of between 700 and 900 Watts and wherein microwave radiation is provided in cycles of a pulsed/modulated microwave frequency. For the purposes of the present application, the term "commercial microwave oven" is considered to encompass microwave ovens that provide continuous microwaves at a power output of between 1,000 and 1,900 Watts.

It will be appreciated that the amount of energy transmitted to the cured thermosetting resin during irradiation is, amongst other things, dependent on the type of electromagnetic radiation provided to the cured thermosetting resin substrate; the size and thickness of the cured thermosetting resin substrate being irradiated; and the overall time for which the cured thermosetting resin substrate is irradiated.

In particular, the person of skill in the art would be aware that the depth to which the microwave radiation is able to penetrate a sample, is dependent on both the dielectric properties of the substrate and the frequency of the microwaves selected (see Handbook of Food Science, Technology, and Engineering" edited by Yiu H. Hui, Volume 3, page 113-4). A person of skill in the art is able, without any undue experimentation, to select processing parameters that ensure sufficient microwave radiation is provided to the thermoset resin substrate.

In some embodiments of the invention, the substrate may have a thickness of up to 20 mm, such as up to 10 mm. In other embodiments, the substrates may have a thickness of at least 0.5 mm, such as 1, 2, 3, 4, or 5 mm. It will be appreciated that in addition to the thermosetting resin material itself the substrate may contain other materials such as described here, for example, fillers and/or fibres.

Accordingly, it will be appreciated that the incorporation of physical features which, in part, reduce the thickness of the cured thermosetting resin substrates, such as channels, grooves and perforations, may be used to enable microwave radiation to penetrate further towards the centre of the resin substrate. This in turn can increase the shapability of the irradiated cured thermosetting resin substrate and thereby the extent to which the resin substrate may be shaped/reshaped.

In a preferred embodiment, the cured thermosetting resin substrate is irradiated for less than 30 minutes, more preferably less than 15 minutes. It will be appreciated that for commercial applications, it would be preferable for the time period to be less than 5 minutes, and a low as less than one minute.

In general, the cured thermosetting resin substrate is irradiated for at least 5 seconds, preferably at least 15 seconds, and most preferably the thermosetting resin substrate is irradiated for at least 30 seconds.

For embodiments wherein the confined temperature controlling environment is selected from a liquid, the person of skill in the art would be aware that the use of a liquid confined temperature controlling environment requires selection of a liquid which will not substantially vaporise and/or boil upon application of the electromagnetic radiation. However, the person of skill in the art is able, without any undue experimentation, to select suitable liquids, particularly as their physical properties are for the most part readily available in the art, for example, from the CRC Handbook of Chemistry and Physics.

In addition a person of skill in the art will readily appreciate that there is a relationship between the parameters of the electromagnetic radiation applied (such as wavelength frequency, pulse length modulation and overall irradiation time) and the energy which may be transferred to the cured thermosetting resin substrate. Thus, the person of skill in the art is able to take into account the possible heat energy which will be produced by the irradiated cured thermosetting substrate and thus the temperatures at which the confined temperature controlling environment must function. In one preferred example, the use of the electromagnetic radiation in the process of the present invention results in the liquid temperature controlling environment substance being heated to a temperature of 20 to 95° C., such as 60 to 90° C., during the irradiating step. In such a preferred example the electromagnetic radiation is microwave radiation. In addition, in such a preferred embodiment, the thermosetting resin material is selected from phenolic, polyurethane and polyester resins. Still further, in such a preferred embodiment, the temperature controlling environment liquid is water.

In one embodiment of the present invention, the cured thermosetting resin substrate may be first irradiated and then subsequently shaped. The step of shaping the irradiated cured thermoset resin substrate may occur within 10 minutes of irradiation being complete, preferably within 5 minutes, more preferably within 1 minute, most preferably within 30 seconds.

In another embodiment of the present invention, the step of irradiating the cured thermosetting resin substrate and the step of shaping the irradiated cured thermosetting resin substrate may occur simultaneously.

In a further embodiment of the present invention, the steps of irradiating the cured thermosetting resin substrate and the step of shaping the irradiated cured thermosetting resin substrate may be staggered, i.e. the cured thermosetting resin substrate is initially irradiated only and, after a set period of time, the cured thermosetting resin substrate is shaped whilst irradiation continues.

It will be appreciated that the processing of shaping may take place in a number of stages. By way of example, the process of irradiating and shaping can be repeated a number of times until the desired shape has been obtained. Such a process may be repeated 2, 3, 4 or even 5 more times.

It will be also be appreciated that the process of shaping may use a combination of irradiating and shaping steps such as described above. By way of example, an initial process may use simultaneous irradiating and shaping to obtain a first stage of shaping. Further, more accurate shaping, could then be performed by a process of initial irradiating followed by shaping to allow more accurate desired shapes to be obtained.

Still further, it will be appreciated that each of the aforementioned shaping stages may make use of different process conditions and/or combinations of process conditions. Such different conditions may involve one or more of different temperature controlling environments, different electromagnetic radiations, different parameters for the electromagnetic radiations and/or different shaping processes.

In accordance with the present invention, the step of shaping the irradiated cured thermosetting resin substrate may comprise the step of applying the irradiated resin to a mould.

The step of shaping the irradiated resin may also include the application of pressure. In some embodiments, it has been found that the pressure applied to the cured thermosetting resin substrate during the shaping step is less than 20 MPa, and as low as 0.5 MPa. Pressures of 1 MPa to 15 MPa, and 5 MPa to 10 MPa may also be used. It will be appreciated that this means that the step of shaping the irradiated substrate can be performed by hand.

More generally, it will be appreciated that the pressure required to shape the cured thermosetting resin substrate may increase as the thickness and/or density of the substrate increases. However, the person of skill in the art is able, without any undue experimentation, to determine the pressure required to shape the cured thermosetting resin substrate based on the composition and dimensions of the resin substrate.

The irradiated cured thermosetting resin substrate may be applied to a mould surface having a surface pattern. The surface pattern may be provided on the mould to provide a surface pattern or texture on the surface of the resin substrate.

By way of example, a pattern relating to the pattern of a woodgrain may be provided on the surface of the mould so as to form a pattern on the surface of the irradiated cured thermosetting resin substrate resembling woodgrain. Other patterns might be provided to give an alternative finish.

The process of moulding may also involve the use of a press and/or vacuum. Such a process may comprise one or two moulds. Where the press comprises two moulds, the two mould surfaces may have different profiles, or matching profiles, for example, so as to produce opposite sides of a door.

The step of shaping the irradiated cured thermosetting resin substrate may comprise compression moulding.

Alternatively, the step of shaping the irradiated cured thermosetting resin substrate comprises thermoforming the irradiated cured thermosetting resin substrate.

In a further alternative, the step of shaping the irradiated cured thermosetting resin substrate may comprise the step of feeding the irradiated resin across and/or through one or more mechanical rollers. The use of a pair of rollers allows a flattened sheet of cured thermosetting resin substrate to be produced.

In some embodiments, the cured thermosetting resin substrate may be substantially flat before irradiation in the confined temperature controlling environment. Such an embodiment allows pre-cured sheets of resin material, which are easier to transport and store, to be shaped as and when desired. Such an embodiment also allows for each individual sheet to be shaped as required and therefore means one flat pre-cured sheet can be used to form a multitude of different shapes in due course. Specific shaping of individual sheets also allows for cost-effective customisation of pre-cured thermosetting resins.

Alternatively, the cured thermosetting resin substrate may be pre-shaped prior to processing in accordance with the present invention; wherein subsequent to or during irradiation, the cured thermosetting resin is re-shaped and/or re-moulded. It will be appreciated that such a process allows for alteration of the shapes in order to better fit their intended purpose, as well as the possibility of recycling previously formed thermoset resin materials by reshaping them for a new purpose. It is also envisaged that the process may comprise taking a pre-shaped thermoset resin substrate and flattening it so as to form a sheet, which sheet could be used or reshaped at a later point in time.

It is envisaged that the cured thermosetting resin substrate used in the present invention may comprise one or more additional layers. Such additional layers may be formed from thermoset resins (including but not limited to those described above), thermoplastic resins and/or elastic materials.

By way of example the cured thermosetting resin substrate may additionally comprise a plurality of layers formed from cured thermosetting resin materials. In such an embodiment, the electromagnetic radiation is used to irradiate all of the layers so as to allow shaping of the substrate.

By way of further example, the cured thermosetting resin substrate may additionally comprise one or more layers of thermoplastic material. In such an embodiment, the heat generated during irradiation of the thermosetting material softens the thermoplastic material and allows shaping of the substrate as a whole.

By way of still further example, the substrate may additionally comprise one or more layers of elastic material. In such an embodiment, the elastic layers are able to bend during shaping of the cured thermosetting resin substrate due to their inherent elastic properties.

It will of course be understood that such multi-layer substrate may, in addition to the cured thermosetting resin material, comprise different combinations of one or more of the additional layers described above.

The one or more additional layers referenced above, may be foamed or un-foamed.

By way of example, the cured thermosetting resin substrate to be shaped could comprise a cured foamed thermosetting resin layer bonded to an un-foamed cured thermosetting resin layer. The foamed layer may be an open-cell foam.

Such a substrate comprising of a cured open-celled thermosetting resin layer bonded to an un-foamed cured thermosetting resin layer can be produced using a pressing process whereby at least a portion of the un-foamed material has flowed in the open-celled material during the original manufacturing process. Such a process may be as defined in one or more of WO2009/044169, WO2010/046699 and/or WO2010/046698 (the contents of each are hereby incorporated herein by reference).

In a preferred embodiment, the process comprises the steps of forming a composite product, the method comprising:
  providing a layer comprising a sheet-form moulding material;
  providing a cured open-cell phenolic resin substrate;
  applying the layer of sheet-form material onto a surface of the cured open-cell phenolic resin substrate; and pressing the sheet-form material to the substrate,
  wherein the substrate has a substantially open-celled structure such that gas and/or vapour can be displaced from the pressing region through a part of the substrate and a portion of the sheet-form material flows into the surface of the substrate during the pressing step.

It will be appreciated that the process of the present invention allows such a composite product to be re-shaped even after it has been cured.

In accordance with a preferred aspect of the present invention, there is provided a method of shaping a cured thermosetting resin substrate, the method comprising the steps of:
  i. providing a cured thermosetting resin substrate (such as described above);
  ii. providing a fluid (such as described above) as a temperature controlling environment;
  iii. at least partially immersing (such as described above) the cured thermosetting resin substrate in the fluid;
  iv. providing a source of electromagnetic radiation (such as described above);
  v. irradiating the at least partially immersed cured thermosetting resin substrate (such as described above); and
  vi. shaping the irradiated thermosetting resin substrate (such as described above).

For the avoidance of any doubt, the term "fluid" as used herein is considered to encompass any substance that can flow or continually deform under an applied shear stress.

In accordance with yet another preferred aspect of the present invention, there is a method of shaping a cured open-cell thermosetting foam resin substrate, the method comprising the steps of:
  i. providing a cured thermosetting open-cell foam resin substrate;
  ii. providing a liquid as a temperature controlling environment;
  iii. at least partially saturating the open-cells of the cured thermosetting foam resin substrate with the liquid;
  iv. providing a source of electromagnetic radiation;
  v. irradiating the at least partially saturated cured open-cell thermosetting foam resin substrate; and
  vi. shaping the irradiated open-cell thermosetting foam resin substrate.

Terms referenced in this embodiment have the same meaning as like terms defined hereinabove, and may be combined with one or more of the disclosures above.

In accordance with another aspect of the present invention, there is provided a method of recycling a pre-shaped cured thermosetting resin substrate, the method comprising the steps of:
  i. providing a pre-shaped cured thermosetting resin substrate;
  ii. providing a confined temperature controlling environment;

iii. placing the pre-shaped cured thermosetting resin substrate in the confined temperature controlling environment;

iv. providing a source of electromagnetic radiation;

v. irradiating the pre-shaped cured thermosetting resin substrate in the confined temperature controlling environment; and vi. re-shaping the irradiated thermosetting resin substrate.

Once again, terms referenced in this embodiment have the same meaning as like terms defined hereinabove, and may be combined with one or more of the disclosures above.

The present invention is also directed to a cured thermosetting resin substrate which has been shaped by a method as described herein.

In addition, the present invention encompasses recycled cured thermoset resins which have been re-shaped by a method as described herein.

In a preferred embodiment, the cured thermosetting resin substrate is selected from a phenolic resin, polyester, acrylic resin, vinyl ester, polyurethane, or an epoxy resin. Alternatively, the cured thermosetting resin substrate may be selected from a sheet moulding compound (SMC).

The inventors of the present invention having surprisingly found that the use of electromagnetic radiation under the selected reaction conditions, makes it is possible to shape thermosetting resin substrates which have already been cured. Such use of electromagnetic radiation runs counter to known uses where it is expressly for the purpose of curing resins. Accordingly, an aspect of the present invention is directed to the use of electromagnetic radiation for shaping a cured thermosetting resin substrate. Such use may be defined in accordance with any of the methods described above.

Yet a further aspect of the present invention is directed to the use of electromagnetic radiation for recycling a pre-shaped cured thermosetting resin substrate. Such recycling may include the reshaping of the pre-shaped cured thermosetting resin substrate. Again, such use may be defined in accordance with any of the methods described above.

Preferably, in use, the electromagnetic radiation is provided to the cured thermosetting resin substrate whilst the substrate is at least substantially immersed in a confined temperature controlling environment. More preferably, the cured thermosetting resin substrate is completely immersed in the confined temperature controlling environment. Preferably, the temperature controlled environment is selected from a liquid, such as water.

As discussed above, it is believed that the temperature controlling environment plays an important role in the process of the present invention.

Preferably, the electromagnetic radiation is selected from microwave, radio waves (RF), ultra-sound and infrared. More preferably, the electromagnetic radiation is microwave radiation.

In accordance with still yet a further aspect of the present invention, there is provided an apparatus for use in shaping a cured thermosetting resin comprising:

(i) a container for receiving a cured thermosetting resin;

(ii) a source of temperature controlling environment; and (iii) a controllable electromagnetic radiation source The apparatus may further comprise a shaping apparatus. In particular, the shaping apparatus may be selected from a mould surface, such as a mould comprising a surface pattern, or one or more mechanical rollers. Examples of such devices are described in detail above.

Any feature in one aspect of the invention may be applied to other aspects of the invention, in any appropriate combination. In particular, method aspects may be applied to apparatus aspects or product aspects, and vice versa.

The present invention will now be described, purely by way of example.

EXAMPLES

Example 1

Example 1 illustrates the effect of microwave radiation alone on a thermosetting resin substrate where no temperature controlling environment is present.

In this example, a cured open-celled phenolic resin foam, produced in accordance with the disclosure above and available from Acell Holdings Limited, of dimensions 25 cm×25 cm×2 cm was placed in a domestic microwave providing a power of 800 W. The cured open-celled phenolic resin foam was irradiated for ten minutes. The surface temperature of the substrate was 90° C. as measured using a thermocouple, and the temperature of the water about 85° C. (for reference, similar temperatures were seen in all of the Examples).

The resulting cured phenolic foam had darkened in colour. In addition, the foam block had further hardened, and therefore was more brittle. Accordingly, the irradiated phenolic foam could not be re-shaped.

Example 2

Example 2 illustrates a method of the present invention.

In this example, an identical sample of the cured open-celled phenolic resin as used in Example 1 was provided having the same dimensions. The cured open-celled phenolic foam was immersed in water, which acted as the temperature controlling environment. The cured open-celled phenolic foam was immersed and saturated in the water such that 80% of the available pore volume was filled with water.

The saturated cured open-celled phenolic foam was then placed in a domestic microwave providing a power of 800 W and was irradiated for ten minutes.

The resulting irradiated cured open-celled phenolic foam was removed from the microwave, the water allowed to drain, and was placed on a pipe for shaping—all within about 30 seconds. The irradiated cured open-celled phenolic foam was shaped to the diameter of the pipe by hand. Upon cooling, and after 2 minutes, the new shape of the cured open-celled phenolic foam was fixed.

This example clearly demonstrates that the presence of a temperature controlling environment is essential to the process, and that the shaping of a cured thermoset resin can be achieved by the method of the present invention.

Example 3

Example 3 also illustrates a method of the present invention.

In this example, an identical sample of the cured open-celled phenolic resin as used in Example 1 was provided having the same dimensions. The cured open-celled phenolic foam was immersed in water, which acted as temperature controlling environment. The cured open-celled phenolic foam was immersed in the water and saturated such that 80% of the available pore volume of the cured open-celled phenolic foam was filled with water.

The saturated cured open-celled phenolic foam was then placed in a domestic microwave providing a power of 800 W and was irradiated for ten minutes.

The resulting irradiated cured open-celled phenolic foam was removed from the microwave, the water allowed to drain, and was shaped—all within about 30 seconds. For this example, the substrate was shaped by twisting the corners of the substrate by hand in opposite directions. The phenolic foam retained the new shape upon cooling.

This example also illustrates that the method of the present invention enables the shaping of cured thermosetting resin substrates.

Example 4

Example 4 illustrates the effect of heating a cured thermosetting resin in the presence of a temperature controlling environment but without the use of electromagnetic radiation.

In this example, an identical sample of the cured open-celled phenolic resin as used in Example 1 was provided having the same dimensions The cured open-celled phenolic resin was placed in boiling water and maintained in this state for 10 minutes.

The resulting cured open-celled phenolic foam was removed from the boiling water, the water allowed to drain, and shaping was attempted—all within about 30 seconds. However, the cured open-celled phenolic foam could not be shaped.

This demonstrates that the effect of shaping a cured thermosetting resin cannot be attributed to the application of heat alone, nor to the presence of the temperature controlling environment alone, but that the present invention requires the use of electromagnetic radiation.

Example 5

This example further illustrates the method of the present invention, even where a thermosetting resin substrate has already been previously shaped.

In this example, the shaped product from Example 2 was used.

The shaped product from Example 2 was immersed in water, which acted as the temperature controlling environment. The shaped product was immersed and saturated in the water such that 80% of the available pore volume was filled with water.

The saturated shaped product was then placed in a domestic microwave providing a power of 800 W and was irradiated for ten minutes.

The resulting irradiated shaped product was removed from the microwave, the water allowed to drain, and was placed on a pipe for re-shaping in the opposite direction—all within about 30 seconds. The shaped product was re-shaped by hand to the diameter of the pipe. Upon cooling, and after 2 minutes, the new re-shape of the product from Example 2 was fixed.

This example clearly demonstrates that re-shaping of cured thermosetting resin substrates is possible, even where the substrate has already been shaped using a method in accordance with the present invention.

Example 6

Example 6 demonstrates the traditional effect of microwave radiation on a cured SMC resin substrate.

In this example, the process of Example 1 was filed except a cured sample of sheet moulding compound (SMC) known as Menzolit® SMC 0650 (polyester) was used. The dimensions of the cured sample were approximately 25 cm×25 cm×2 mm. The cured sample was placed in a domestic microwave providing a power of 800 W. The cured sample was irradiated for ten minutes.

After irradiating, the sample was placed on a pipe for shaping but could not be shaped.

Example 7

Example 7 illustrates the method of the present invention as applied to cured SMC resins.

The cured SMC sample was immersed in water, which acted as the temperature controlling environment. The immersed cured SMC resin sample was then placed in a domestic microwave providing a power of 800 W and was irradiated for ten minutes.

The resulting irradiated cured SMC resin sample was removed from the microwave and shaped on a pipe within 30 seconds of completion of irradiation. The cured SMC resin sample was shaped to the diameter of the pipe by hand. The cured SMC sample retained the new shape upon cooling.

This example demonstrates that the process of the present invention can be applied generally to cured thermosetting resin substrates.

Example 8

Example 8 repeated the process of Example 3, except using a cured SMC (polyester) resin.

In this example, an identical sample of the cured SMC resin used in Example 6 was provided having the same dimensions, and was processed in accordance with the method of Example 3.

The resulting cured irradiated SMC resin sample was removed from the microwave and was shaped within 30 seconds of completion of the irradiation by twisting the corners of the irradiated cured SMC resin by hand in opposite directions. The SMC retained the new shape upon cooling.

Example 9

Example 9 repeated the process of Example 4, except using a cured SMC (polyester) resin.

In this example, an identical sample of the cured SMC resin used in Example 6 was provided having the same dimensions, and was processed in accordance with the method of Example 4.

The resulting cured SMC resin was removed from the boiling water and shaping was attempted—all within about 30 seconds. However, the cured SMC resin could not be shaped.

This demonstrates that the effect of shaping a cured thermosetting resin cannot be attributed to the application of heat alone, nor to the presence of the temperature controlling environment alone, but that the present invention requires the use of electromagnetic radiation, even where different thermosetting resins are used.

Example 10

Example 10 repeated the process of Example 5, except using a cured SMC (polyester) resin.

In this example, the shaped product of Example 7 was used, and was processed in accordance with the method of Example 5.

The resulting shaped cured SMC resin sample was removed from the microwave and was placed on a pipe for re-shaping in the opposite direction—all within about 30 seconds. The shaped product was re-shaped by hand to the diameter of the pipe. Upon cooling, and after 2 minutes, the new re-shape of the product from Example 7 was fixed.

This example clearly demonstrates that re-shaping of cured polyester thermosetting resin substrates is possible, even where the cured polyester material has already been shaped using a method in accordance with the present invention.

Example 11

Example 11 illustrates the method of the present invention as applied to cured polyurethane resins.

A cured polyurethane sheet containing a glass fibre mat was prepared using Axson PX 223/HT. The ratio of resin to fibre was 75:25.

A cured 25 cm×25 cm×4 mm sample was prepared and was immersed in water, which acted as the temperature controlling environment. The immersed cured polyurethane resin sample was then placed in a domestic microwave providing a power of 800 W and was irradiated for ten minutes.

The resulting irradiated cured polyurethane resin sample was removed from the microwave and shaped on a pipe within 30 seconds of completion of irradiation. The cured polyurethane resin sample was shaped to the diameter of the pipe by hand. The cured polyurethane sample retained the new shape upon cooling.

This example demonstrates again demonstrates that the process of the present invention is generally applicable to cured thermosetting resin substrates.

The invention claimed is:

1. A method of shaping a cured thermosetting resin substrate, the method comprising the steps of:
  i. providing a cured thermosetting resin substrate;
  ii. providing a confined temperature controlling environment;
  iii. placing the cured thermosetting resin substrate in the confined temperature controlling environment;
  iv. providing a source of electromagnetic radiation;
  v. irradiating the cured thermosetting resin substrate in the confined temperature controlling environment; and
  vi. shaping the irradiated thermosetting resin substrate.

2. The method according to claim 1, wherein the confined temperature controlling environment is in the form of a gas, vapor, liquid, gel, or any combination thereof.

3. The method according to claim 2, wherein the confined temperature controlling environment is a liquid, and the liquid has a boiling point of 100° C. or greater.

4. The method according to claim 2, wherein the confined temperature controlling environment is a liquid, and is selected from the group consisting of ethylene glycol, butanol, toluene, decane, water, and any combinations thereof.

5. The method according to claim 2, wherein the confined temperature controlling environment is a liquid, and the liquid is heated to a temperature of 20 to 95° C. during irradiating.

6. The method according to claim 1, wherein at least 50% of the cured thermosetting resin substrate is immersed in the confined temperature controlling environment.

7. The method according to claim 1, wherein the cured thermosetting resin substrate is selected from the group consisting of a phenolic resin, polyester, acrylic resin, vinyl ester, polyurethane, an epoxy resin and a sheet-form molding material.

8. The method according to claim 7, wherein the cured thermosetting resin substrate is selected from the group consisting of phenolic resin, polyester and polyurethane.

9. The method according to claim 1, wherein the cured thermosetting resin substrate further comprises one or more fillers, wherein the one or more fillers are selected from the group consisting of clays, clay minerals, talc, graphite, calcium carbonate, gypsum, alumina, silicates, vermiculite, refractories, solid or hollow glass microspheres, fly ash, coal dust, wood flour, grain flour, nut shell flour, silica, finely chopped glass fibers, finely divided asbestos, chopped mineral fibers, finely chopped natural or synthetic fibers, ground plastics and resins in the form of powder or fibers, reclaimed waste plastics, reclaimed waste resins, pigments, powdered paint, carbon black, starches, and any combination thereof.

10. The method according to claim 1, wherein the cured thermosetting resin substrate comprises an open-cell structure.

11. The method according to claim 10, wherein at least 50% of available pore volume of the cured thermosetting resin substrate is filled with the confined temperature controlling environment.

12. The method according to claim 1, wherein the electromagnetic radiation is selected from the group consisting of microwave, radiofrequency, ultra-sound and infrared.

13. The method according to claim 12, wherein the electromagnetic radiation is microwave radiation, and the microwave radiation has a wavelength of 10 to 50 cm.

14. The method according to claim 12, wherein the electromagnetic radiation is microwave radiation, and the microwave radiation has a frequency of 25 GHz to 450 MHz.

15. The method according to claim 12, wherein the electromagnetic radiation is microwave radiation, and the microwave radiation transmits a power of 750 W to 100 kW.

16. The method according to claim 1, wherein the cured thermosetting resin is irradiated for less than 10 minutes.

17. The method according to claim 1, further comprising pre-treating the cured thermosetting resin substrate, wherein the pre-treating comprises cooling the cured thermosetting resin substrate.

18. The method according to claim 1, wherein the cured thermosetting resin substrate is subjected to a shaping pre-treatment, the shaping pre-treatment comprising changing a pre-shaped shape of the cured thermosetting resin substrate.

* * * * *